UNITED STATES PATENT OFFICE.

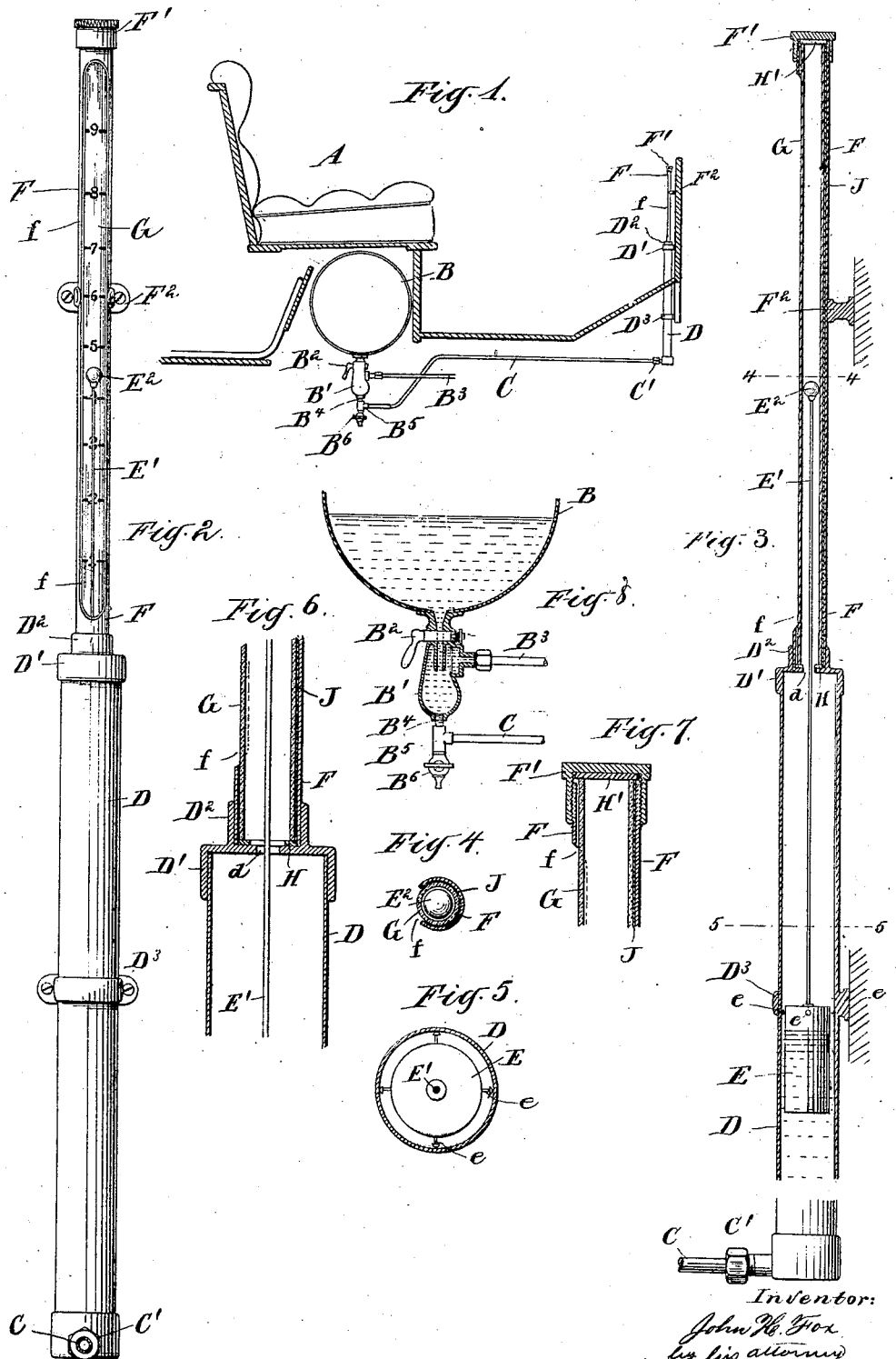

JOHN H. FOX, OF NEW YORK, N. Y., ASSIGNOR, BY MESNE ASSIGNMENTS, TO FOX ACCESSORIES CO. INC., OF BROOKLYN, NEW YORK, A CORPORATION OF NEW YORK.

GASOLENE-GAGE.

1,189,440. Specification of Letters Patent. Patented July 4, 1916.

Application filed May 19, 1915. Serial No. 29,024.

*To all whom it may concern:*

Be it known that I, JOHN H. Fox, a citizen of the United States, residing in the city of New York, borough of Brooklyn, in the county of Kings and State of New York, have invented a certain new and useful Improvement in Gasolene-Gages, of which the following is a specification.

The invention relates to means for indicating the quantity of gasolene in the supply tank of an automobile, and the object of the invention is to provide a gage conveniently located for inspection on the dash of the automobile, which shall be simple in construction, operate efficiently, and indicate accurately in liquid measure the quantity of gasolene in the tank.

The invention consists in certain novel features and details of construction and arrangement by which the above objects are attained, to be hereinafter described and claimed.

The accompanying drawings form a part of this specification and show the invention as it has been carried out in practice.

Figure 1 is a vertical section partly in elevation showing the gage in place on an automobile, with so much of the latter as is necessary to show the connections and relative locations of parts. Fig. 2 is an elevation of the gage alone, on a larger scale. Fig. 3 is a corresponding vertical section, partly in elevation. Fig. 4 is a transverse section taken on the line 4—4 in Fig. 3. Fig. 5 is a similar view taken on the line 5—5 in Fig. 3. Fig. 6 is a vertical section, corresponding to a portion of Fig. 3, and on a still larger scale. Fig. 7 is a similar view of another portion of Fig. 3. Fig. 8 is a vertical section, partly in elevation, showing a portion of the gasolene tank and the connections therefrom.

Similar letters of reference indicate the same parts in all the figures.

A is the seat of an automobile and B a cylindrical gasolene tank disposed horizontally thereunder, having a sediment bulb $B^1$ attached at a low point, controlled by the cock $B^2$ as usual and having a feed-pipe $B^3$ leading therefrom to a carbureter and engine, not shown. At the extreme lower end of the bulb is a nipple $B^4$ on which is a T $B^5$ having at its lower end the usual drain cock $B^6$. Extending from the lateral branch opening of the T is a pipe C leading to the gage and serving to maintain the gasolene therein at the same level as in the tank.

D is a vertically disposed cylindrical float-chamber closed and reinforced at the lower end to receive a coupling $C^1$ by which the pipe C is attached thereto, containing a float E, which may be a cylinder of cork, adapted to rise or sink with the changes of liquid level in the tank B and chamber D. A cap $D^1$ on the upper end of the float-chamber has a central opening $d$ and a socket $D^2$ in which is fastened a vertical tubular shell F slotted on one face for nearly its entire length, as at $f$, and closed at the top by a screw-cap $F^1$.

G is a glass tube inclosed in the shell F and serving as a guide for an index $E^2$, shown as a ball and preferably brightly colored, mounted on the upper end of a stem or light rod $E^1$ extending upwardly from the float E through the opening $d$ axially of the float-chamber and glass tube.

On the inner surface of the shell F and visible through the slot $f$ are graduations properly spaced to indicate, with the index $E^2$, the contents of the tank in gallons and are correspondingly numbered. The marks and figures may be painted upon the shell but are preferably printed on a strip of heavy paper or other material cemented upon such surface.

The height of the chamber D is somewhat greater than the depth or diameter of the tank to permit the float to rise or sink to the full limit of the changes in level of the tank from full to empty, and it is located upon the dash correspondingly and with the shell with its glass tube and graduations fully exposed to view. Brackets $F^2$ $D^3$ serve to hold the gage in position.

The pipe C is of small bore and while permitting sufficient flow to maintain equality of level in the chamber D, prevents rapid fluctuations in level due to waves or agitation of the gasolene in the tank B, and the glass tube G is seated in the cap $D^1$ on a gasket H of leather or cork to make a tight joint at the lower end while the upper end of the glass tube is closed by a disk $H^1$ of similar yielding material in the screw-cap $F^1$, the latter serving to hold the glass tube compressed between the washer and gasket and thus seal the joints and avoid danger of gasolene from the float-chamber escaping when agitated.

By introducing the T B⁵ between the bulb B¹ and drain-cock B⁶, the connection to the gage may be readily made at the desired extreme low point relatively to the tank and without requiring any alteration of the latter or of the connections to the carbureter, and by spacing the graduations irregularly to indicate the changes of tank level in terms of liquid measure, as gallons, instead of simply height, as inches, the operator is always aware of the supply in gallons without further calculation. The gage thus marked also aids as a check in avoiding overcharge for gasolene supplied to the tank, as the rise of the index clearly indicates the number of gallons introduced.

To avoid liability of the float E to adhere to the adjacent inner surface of the chamber D and thus fail to respond quickly to changes in level, it is provided with spurs *e* extending radially near the top, serving to contact with such surface and hold the float centrally and free.

The gage is easily installed and connected and presents a neat and ornamental appearance, and occupies but little space.

I claim:—

A gasolene gage having means for attachment to the dash of an automobile and embodying a vertically disposed float chamber closed at its lower end, a removable cap at the upper end having a central opening and a depending socket and an upwardly extended socket, a vertical tubular shell in said upwardly extended socket and longitudinally slotted, a glass tube inclosed in said shell, a cap closing the upper end of said shell and having depending screw-threaded socket engaging threads on said shell and a strip of material between said shell and glass tube bearing graduations visible through said glass tube, the cap to said float chamber having a central opening, a stem freely movable through said opening, an index on the upper end of said stem movable in the glass tube, and a float on the lower end of said stem movable in the float chamber.

In testimony that I claim the invention above set forth I affix my signature in presence of two witnesses.

JOHN H. FOX.

Witnesses:
  CHARLES R. SEARLE,
  HENRY L. WASHBURN.